(12) United States Patent
Inaba et al.

(10) Patent No.: US 12,179,543 B2
(45) Date of Patent: Dec. 31, 2024

(54) STABILIZER AND METHOD FOR MANUFACTURING STABILIZER

(71) Applicant: NHK SPRING Co., Ltd., Yokohama (JP)

(72) Inventors: Masato Inaba, Kanagawa (JP); Junichi Nakayama, Kanagawa (JP); Yuichiro Yamauchi, Kanagawa (JP)

(73) Assignee: NHK SPRING CO., LTD., Yokohama (JP)

( * ) Notice: Subject to any disclaimer, the term of this patent is extended or adjusted under 35 U.S.C. 154(b) by 224 days.

(21) Appl. No.: 17/625,148

(22) PCT Filed: Jul. 6, 2020

(86) PCT No.: PCT/JP2020/026331
§ 371 (c)(1),
(2) Date: Jan. 6, 2022

(87) PCT Pub. No.: WO2021/006232
PCT Pub. Date: Jan. 14, 2021

(65) Prior Publication Data
US 2022/0266650 A1      Aug. 25, 2022

(30) Foreign Application Priority Data
Jul. 8, 2019   (JP) ................. 2019-127148

(51) Int. Cl.
*B60G 21/055*   (2006.01)
*C21D 9/08*     (2006.01)
(Continued)

(52) U.S. Cl.
CPC ........... *B60G 21/0551* (2013.01); *C21D 9/08* (2013.01); *C22C 38/02* (2013.01); *C22C 38/04* (2013.01);
(Continued)

(58) Field of Classification Search
None
See application file for complete search history.

(56) References Cited

U.S. PATENT DOCUMENTS

2004/0206427 A1   10/2004   Iseda et al.
2005/0011592 A1    1/2005   Smith
(Continued)

FOREIGN PATENT DOCUMENTS

CN   001744956 A   3/2006
CN   101687456 A   3/2010
(Continued)

OTHER PUBLICATIONS

EPO Extended European Search Report for corresponding EP Application 20836268.1; Issue Date, Jul. 3, 2023.
(Continued)

*Primary Examiner* — Xiaobei Wang
(74) *Attorney, Agent, or Firm* — CANTOR COLBURN LLP

(57) ABSTRACT

A stabilizer is a stabilizer including: a main body cylinder portion which is elastically deformable and a pair of connection plate portions respectively connected to a pair of left and right suspension devices, wherein the connection plate portion includes a pair of base material portions located on both sides in the connection plate portion in a plate thickness direction T and an alloy oxide region which is disposed between the pair of base material portions and in which alloy oxides are scattered, and wherein crystal grains constituting the pair of base material portions straddle the alloy oxide region in the plate thickness direction and the pair of base material portions are joined.

6 Claims, 4 Drawing Sheets

(51) Int. Cl.
  *C22C 38/02* (2006.01)
  *C22C 38/04* (2006.01)
  *C22C 38/18* (2006.01)
(52) U.S. Cl.
  CPC ...... *C22C 38/18* (2013.01); *B60G 2204/1224* (2013.01); *B60G 2206/427* (2013.01); *B60G 2206/724* (2013.01); *B60G 2206/81022* (2013.01); *Y10T 428/12* (2015.01)

(56) References Cited

U.S. PATENT DOCUMENTS

| | | |
|---|---|---|
| 2005/0236793 A1 | 10/2005 | Taneda et al. |
| 2007/0216126 A1 | 9/2007 | Lopez et al. |
| 2017/0028808 A1 | 2/2017 | Katsuno |
| 2018/0281348 A1 | 10/2018 | Otomo et al. |
| 2018/0283584 A1 | 10/2018 | Hong |

FOREIGN PATENT DOCUMENTS

| | | |
|---|---|---|
| CN | 202475820 U | 10/2012 |
| CN | 105935728 A | 9/2016 |
| CN | 106061639 A | 10/2016 |
| CN | 107107701 A | 8/2017 |
| JP | S55130331 A | 10/1980 |
| JP | 07237428 A | 9/1995 |
| JP | 2001163026 A | 6/2001 |
| JP | 2004292897 A | 10/2004 |
| JP | 2006283131 A | 10/2006 |
| JP | 2007320344 A | 12/2007 |
| JP | 2007320407 A | 12/2007 |
| JP | 2009142827 A | 7/2009 |
| JP | 2011214042 A | 10/2011 |
| JP | 2015205675 A | 11/2015 |
| KR | 20180074469 A | 7/2018 |
| KR | 20190052866 A | 5/2019 |
| WO | 02060683 A1 | 8/2002 |
| WO | 2011148792 A1 | 12/2011 |

OTHER PUBLICATIONS

CNIPA Office Action for corresponding CN Application No. 2020800483104; Dated Mar. 27, 2023.
Wang et al., "Ultrasonic-assisted brazing of Al/Fe with Al alloy", Transactions of the China Welding Institution, vol. 34, No. 10, Oct. 2013, pp. 47-50.
International Search Report for International Application No. PCT/JP2020/026331; Date of Mailing; Sep. 24, 2020.
CNIPA Notice of Allowance corresponding to CN Application No. 202080048310.4; Issue Date, Aug. 10, 2023.

STABILIZER AND METHOD FOR MANUFACTURING STABILIZER

CROSS REFERENCE TO RELATED APPLICATIONS

This is the U.S. national stage of application No. PCT/JP2020/026331, filed on Jul. 6, 2020. Priority under 35 U.S.C. § 119 (a) and 35 U.S.C. § 365 (b) is claimed from Japanese Application No. 2019-127148, filed Jul. 8, 2019, the disclosure of which is also incorporated herein by reference.

TECHNICAL FIELD

The present invention relates to a stabilizer and a method for manufacturing a stabilizer.

Priority is claimed on Japanese Patent Application No. 2019-127148, filed Jul. 8, 2019, the content of which is incorporated herein by reference.

BACKGROUND ART

Conventionally, as a method for manufacturing a stabilizer including an elastically deformable main body cylinder portion and a pair of connection plate portions respectively connected to a pair of left and right suspension devices, for example, a method including a heating step of heating both end portions of a steel pipe and a forging step of radially crushing both end portions of the heated steel pipe to form connection plate portions is known as shown in Patent Literature 1 below.

RELATED ART DOCUMENTS

Patent Documents

[Patent Document 1]
Japanese Unexamined Patent Application, First Publication No. 2007-320344

SUMMARY

Technical Problem

However, in the conventional method for manufacturing the stabilizer, in the heating step, Fe oxides are formed on inner peripheral surfaces of both end portions of the steel pipe. As shown in FIG. 5, in the forging step, Fe oxides 101 constituted a layer extending in a direction orthogonal to a plate thickness direction T and a connection plate portion is formed in which the layer is sandwiched between a pair of base material portions 102 from both sides in the plate thickness direction T. In this connection plate portion, since the pair of base material portions 102 are divided in the plate thickness direction T by the layered Fe oxides 101, it is difficult to guarantee that no gap is formed between the pair of base material portions 102.

The present invention has been made in view of such circumstances and an object of the present invention is to provide a stabilizer preventing a gap from being formed between a pair of base material portions and a method for manufacturing the stabilizer.

Solution to Problem

A stabilizer of the present invention is a stabilizer including: a main body cylinder portion which is elastically deformable; and a pair of connection plate portions respectively connected to a pair of left and right suspension devices, wherein each connection plate portion of the pair of connection plate portions includes a pair of base material portions located on both sides in the connection plate in a plate thickness direction and an alloy oxide region which is disposed between the pair of base material portions and in which alloy oxides are scattered, and wherein crystal grains constituting the pair of base material portions straddle the alloy oxide region in the plate thickness direction and the pair of base material portions are joined.

According to the present invention, since crystal grains constituting the pair of base material portions straddle the alloy oxide region in the plate thickness direction, it is possible to firmly join the pair of base material portions and to prevent a gap from being formed between the pair of base material portions. Accordingly, since it is possible to prevent a gap from being formed between the pair of base material portions, for example, even when the connection plate portion is quenched after the forging step, it is possible to ensure the strength of the connection plate portion even when the stabilizer is made thinner to reduce the weight.

Here, the connection plate portion may be made of a Fe alloy containing an easily oxidizable element that is more easily oxidized than Fe.

In this case, it is possible to reliably obtain a connection plate portion in which crystal grains constituting the pair of base material portions straddle the alloy oxide region in the plate thickness direction and the pair of base material portions are joined.

Further, the Fe alloy may contain at least one of Si, Mn, and Cr.

In this case, since Si, Mn, and Cr are elements generally contained in spring steel and the current manufacturing method does not need to be significantly changed, it is possible to reduce an increase in cost and to reliably obtain the connection plate portion in which the pair of base material portions are joined.

A method for manufacturing a stabilizer of the present invention, the stabilizer including a main body cylinder portion which is elastically deformable and a pair of connection plate portions respectively connected to a pair of left and right suspension devices, includes: a heating step of heating both end portions of a steel pipe; and a forging step of radially crushing both end portions of the heated steel pipe to form the pair of connection plate portions, wherein in the heating step, both end portions of the steel pipe are simultaneously heated, wherein the steel pipe is made of an Fe alloy containing an easily oxidizable element that is more easily oxidized than Fe, and wherein the heating step includes an oxygen reduction step of forming Fe oxides on inner peripheral surfaces of both end portions of the steel pipe and reducing the amount of oxygen contained in air inside both end portions of the steel pipe and a reduction step of causing a reduction reaction in the Fe oxides by using the easily oxidizable element as a reducing agent and removing oxygen from the Fe oxides.

According to the present invention, since both end portions of the steel pipe are simultaneously heated in the heating step, in the oxygen reduction step, air inside both end portions of the steel pipe simultaneously expands and Fe oxides are formed on the inner peripheral surfaces of both end portions of the steel pipe while the entry of external air into both end portions of the steel pipe is regulated. Accordingly, since it is possible to reduce the amount of oxygen contained in air inside both end portions of the steel pipe in the oxygen reduction step, it is possible to reduce the amount of Fe oxides formed on the inner peripheral surfaces of both end portions of the steel pipe.

Additionally, the simultaneous heating of both end portions of the steel pipe in the heating step is not limited to the case of simultaneously starting and ending the heating of both end portions of the steel pipe if Fe oxides can be formed on the inner peripheral surfaces of both end portions of the steel pipe while the entry of external air into both end portions of the steel pipe is regulated and also includes the case of simultaneously heating both end portions of the steel pipe for a certain time even when the heating start and end timings for both end portions of the steel pipe in the heating step are different.

The heating step includes the reduction step of causing a reduction reaction in Fe oxides formed in the oxygen reduction step by using an easily oxidizable element contained in the Fe alloy forming the steel pipe as a reducing agent. Thus, oxygen in the Fe oxides can be removed from the Fe oxides by combining with the easily oxidizable elements in the Fe alloy. At this time, since the alloy oxides in which oxygen removed from the Fe oxides and the easily oxidizable elements are combined have a low amount of Fe oxides formed in the oxygen reduction step, the alloy oxides do not extend continuously in a layered shape in the circumferential direction around the pipe axis of the steel pipe, but are scattered in the circumferential direction. Accordingly, if both end portions of the steel pipe are radially crushed in the forging step, it is possible to obtain the connection plate portion including the alloy oxide region in which the alloy oxides are scattered in the creepage direction orthogonal to the plate thickness direction and the pair of base material portions sandwiching the alloy oxide region from both sides in the plate thickness direction. At this time, crystal grains constituting the pair of base material portions straddle the alloy oxide region in the plate thickness direction through a gap between the alloy oxides and the pair of base material portions are joined in the plate thickness direction.

As described above, it is possible to firmly join the pair of base material portions and to prevent a gap from being formed between the pair of base material portions.

Here, in the heating step, both end portions of the steel pipe may be heated while the steel pipe is positioned such that a portion of the steel pipe located on a center side in a longitudinal direction in relation to both end portions of the steel pipe and including at least a center portion of the steel pipe in the longitudinal direction is substantially horizontal.

In this case, since both end portions of the steel pipe are heated while the steel pipe is positioned such that a portion of the steel pipe located on a center side in a longitudinal direction in relation to both end portions of the steel pipe and including at least a center portion of the steel pipe in the longitudinal direction is substantially horizontal in the heating step, air inside both end portions of the steel pipe easily expands while smoothly entering the steel pipe in the oxygen reduction step and hence the entry of external air into both end portions of the steel pipe can be reliably regulated.

Further, both end portions of the steel pipe may be located at the lowest position in the steel pipe in the heating step.

In this case, since both end portions of the steel pipe are located at the lowest position in the steel pipe in the heating step, it is possible to smoothly expand air inside both end portions of the steel pipe in the oxygen reduction step and to reliably prevent the entry of external air into both end portions of the steel pipe.

Effect

According to the present invention, it is possible to prevent a gap from being formed between a pair of base material portions.

DETAILED DESCRIPTION

Figure 1:
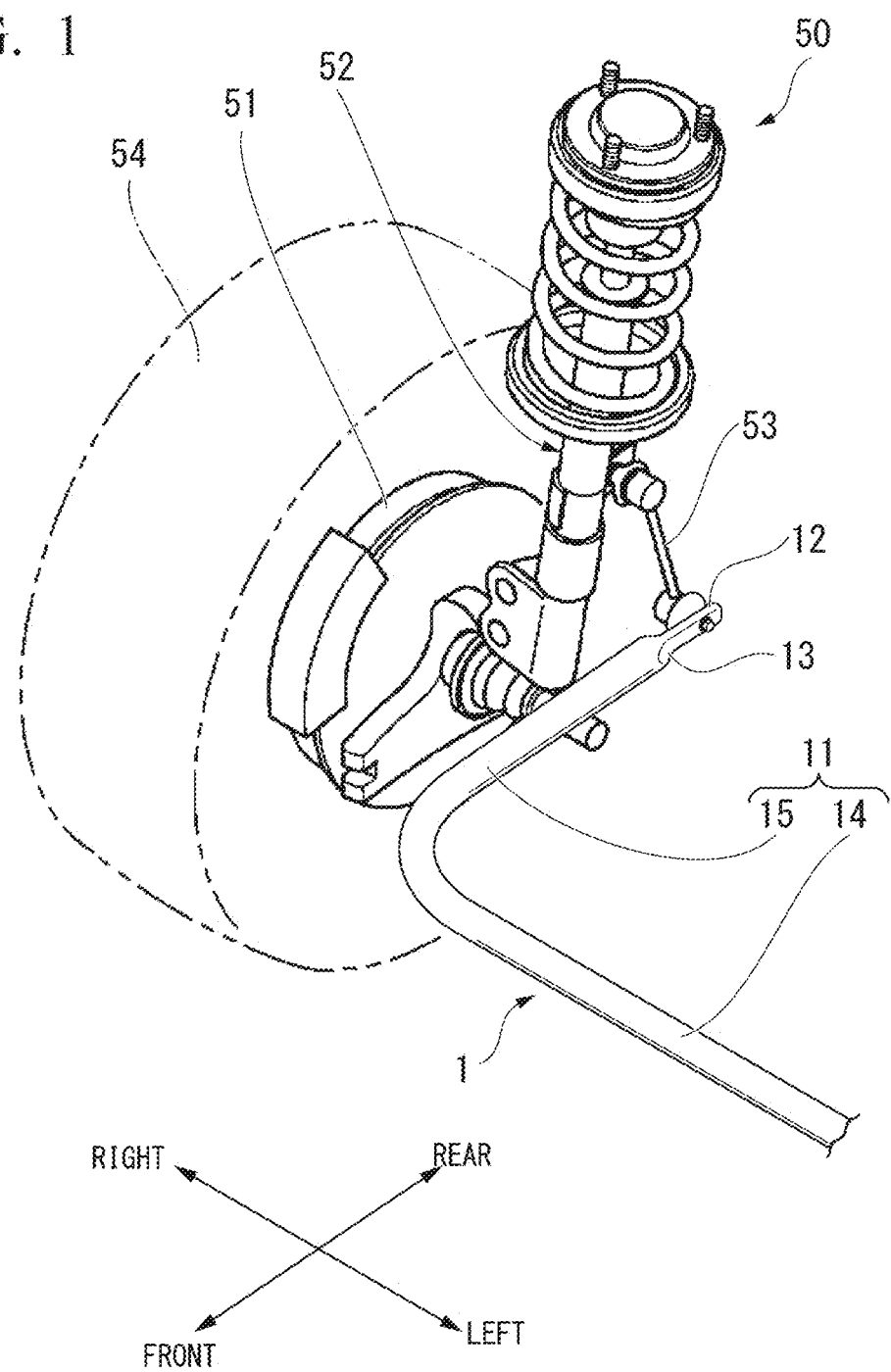
FIG. 1 is a perspective view showing a state in which a stabilizer shown as an embodiment according to the present invention is attached to a suspension device.

Hereinafter, an embodiment of a stabilizer according to the present invention will be described with reference to FIGS. 1 to 4.

A stabilizer 1 of this embodiment includes a main body cylinder portion 11, connection plate portions 12, and transition portions 13 and connects a pair of left and right suspension devices 50 to each other. The main body cylinder portion 11, the connection plate portions 12, and the transition portions 13 are integrally formed with each other. The main body cylinder portion 11, the connection plate portions 12, and the transition portions 13 are made of, for example, spring steel.

First, the suspension device 50 will be described.

The suspension device 50 includes a support portion 51 which rotatably supports a vehicle wheel 54, a shock absorber 52 which includes a cylinder in which a lower end portion is attached to the support portion 51, and a stabilizer link 53 which connects the cylinder of the shock absorber 52 to the stabilizer 1.

Hereinafter, the stabilizer 1 will be described based on a state in which the stabilizer is positioned to be attached to the suspension device 50. Further, the front, rear, left and right sides of the vehicle are those as viewed by the occupant of the vehicle on which the suspension device 50 is mounted.

The main body cylinder portion 11 includes a torsion portion 14 which extends in the left and right direction of the vehicle and a pair of arm portions 15 which extend respectively from both end portions of the torsion portion 14 in the left and right direction toward the rear side of the vehicle and is formed to be elastically deformable. The main body cylinder portion 11 is formed in a tubular shape.

The length of the torsion portion 14 is longer than the length of the arm portion 15. The outer peripheral surface of the torsion portion 14 extends straight in the left and right direction over the entire length thereof in the left and right direction. The outer peripheral surface of the arm portion 15 extends straight in the front and rear direction over the entire length thereof in the front and rear direction. Each of the inner diameter and the outer diameter of the torsion portion 14 is the same over the entire length thereof. Each of the inner diameter and the outer diameter of the arm portion 15 is the same over the entire length thereof. The inner diameter and the outer diameter of the torsion portion 14 are respectively the same as the inner diameter and the outer diameter of the arm portion 15. The connection portion between the torsion portion 14 and the arm portion 15 is bent to be convex diagonally forward on the outside in the left and right direction.

Additionally, the length of the torsion portion 14 may be equal to or shorter than the length of the arm portion 15. The torsion portion 14 and the arm portion 15 may be curved. The inner diameters of the torsion portion 14 and the arm portion 15 may be different from each other and the outer diameters of the torsion portion 14 and the arm portion 15 may be different from each other.

The connection plate portion 12 protrudes straight from the side of the arm portion 15 of the main body cylinder portion 11 toward the rear side. That is, the connection plate portion 12 is provided respectively at both ends of the main body cylinder portion 11. Additionally, the connection plate portion 12 may protrude from the side of the arm portion 15 of the main body cylinder portion 11 toward the rear side, for example, while being bent in the left and right direction. The connection plate portion 12 is formed in a plate shape in which the two side surfaces thereof face the left and right direction of the vehicle. That is, the plate thickness direction of the connection plate portion 12 coincides with the left and right direction of the vehicle while the stabilizer 1 is attached to the suspension device 50.

The connection plate portion 12 is provided with a through-hole penetrating the connection plate portion 12 in the plate thickness direction. The connection plate portion 12 is connected to the stabilizer link 53 by screwing a nut into a bolt while the bolt is inserted through the through-hole of the connection plate portion 12 and the through-hole formed in the stabilizer link 53.

The connection plate portion 12 is formed by radially crushing the end portion of the steel pipe W during the forging step. When viewed from the rear side, the rear end surface of the connection plate portion 12 has a rectangular shape with the length being in the up and down direction.

As shown in FIG. 1, the transition portion 13 connects the rear end portion of the arm portion 15 of the main body cylinder portion 11 and the front end portion of the connection plate portion 12 and the size of the transition portion 13 in the plate thickness direction of the connection plate portion 12 gradually decreases from the front side toward the rear side. The transition portion 13 is provided with an inner space which communicates with the inside of the main body cylinder portion 11. The size of the inner space in the plate thickness direction gradually decreases from the front side toward the rear side. The front end portion of the inner space of the transition portion 13 is connected to the inside of the rear end portion of the arm portion 15 without a step.

The center portions of the arm portion 15, the transition portion 13, and the connection plate portion 12 in the plate thickness direction coincide with each other. Additionally, at least one center portion of the arm portion 15, the transition portion 13, and the connection plate portion 12 in the plate thickness direction may be shifted in the plate thickness direction with respect to the other center portions thereof in the plate thickness direction.

With the above-described configuration, the stabilizer 1 is elastically deformed when the displacement amounts of the pair of left and right shock absorbers 52 are different, such as when the vehicle is turning, thereby preventing the displacement of the vehicle in the roll direction.

Figure 3:
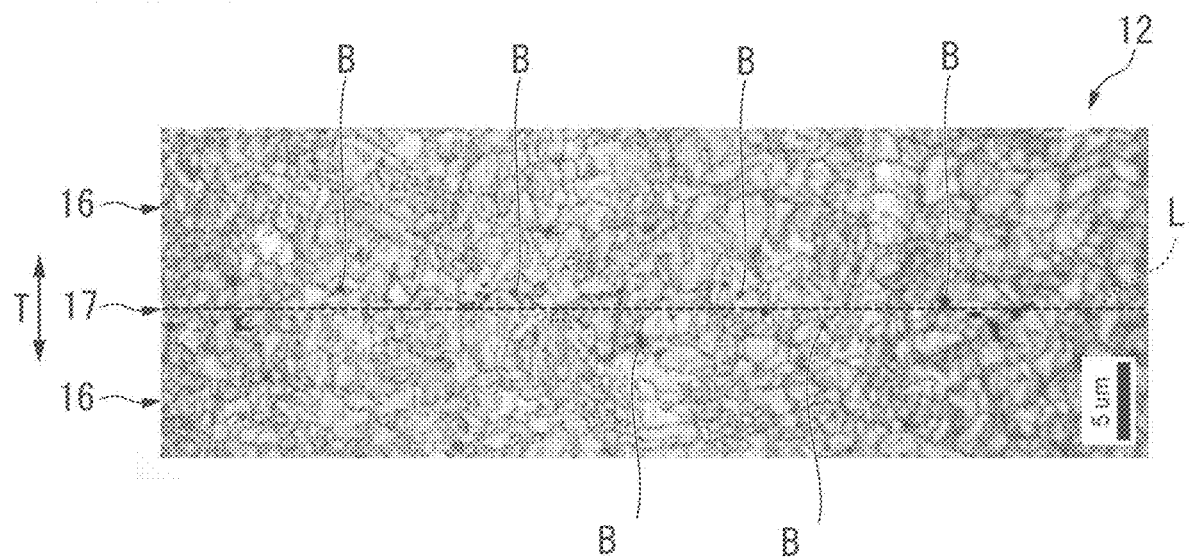
FIG. 3 is an electron micrograph showing a vertical cross-section of a connecting plate portion of the stabilizer shown as an embodiment according to the present invention along a plate thickness direction.
Figure 4:
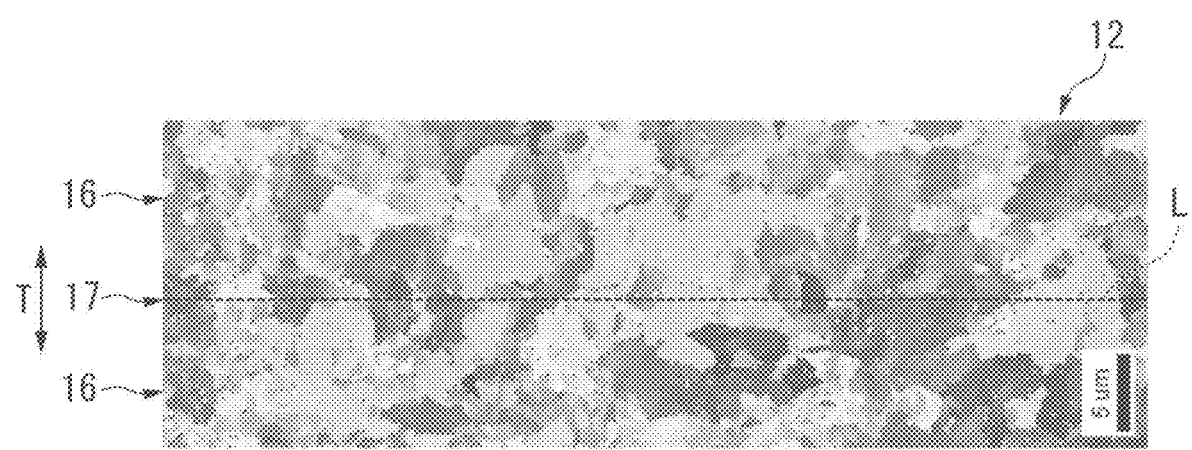
FIG. 4 is an EBSD crystal orientation map at the same site as the site shown in FIG. 3.
Figure 5:
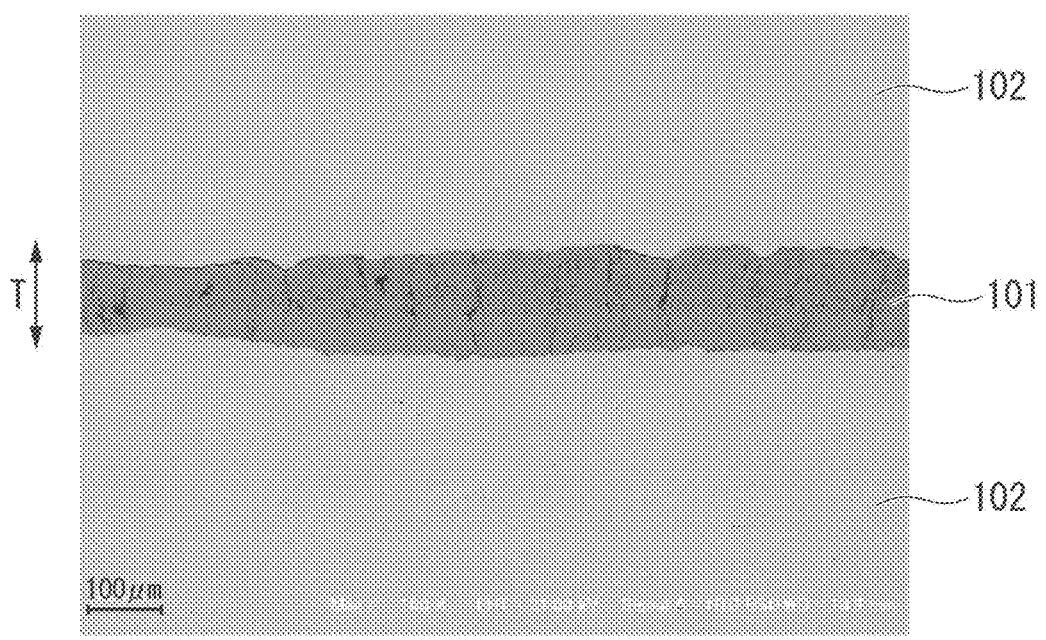
FIG. 5 is an electron micrograph showing a vertical cross-section of a connecting plate portion of a stabilizer shown as a conventional example according to the present invention along a plate thickness direction.

Then, in this embodiment, as shown in FIGS. 3 and 4, the connection plate portion 12 includes a pair of base material portions 16 which are located on both sides in the plate thickness direction T and an alloy oxide region 17 which is disposed between the pair of base material portions 16, and the pair of base material portions 16 are joined while crystal grains constituting the pair of base material portions 16 straddles the alloy oxide region 17 in the plate thickness direction T. The pair of base material portions 16 are joined by, for example, fusion bonding, diffusion, thermocompression bonding, welding, or the like.

The connection plate portion 12 is made of a Fe alloy containing an easily oxidizable element that is more easily oxidized than Fe. Examples of easily oxidizable elements include Si, Mn, Cr, and the like. The Fe alloy contains at least one of Si, Mn, and Cr in addition to C and Fe. The stabilizer 1 including the connection plate portions 12 is entirely made of the same material.

The dashed lines shown in FIGS. 3 and 4 indicate a joining interface L in which the inner peripheral surface of the steel pipe W is flattened to be joined when the end portion of the steel pipe W is radially crushed during a forging step. The joining interface L extends in the creepage direction orthogonal to the plate thickness direction T of the connection plate portion 12. In FIG. 3, a plurality of black spots scattered in the vicinity of the joining interface L indicate alloy oxides B in which easily oxidizable elements contained in the Fe alloy and oxygen in the Fe oxide formed in an oxygen reduction step (described later) are combined during the reduction step (also described later). A predetermined thickness region including the joining interface L is the alloy oxide region 17 in which the alloy oxides B are scattered.

As shown in FIG. 3, the pair of base material portions 16 are not divided in the plate thickness direction T by the alloy oxide region 17, and the pair of base material portions 16 straddle the alloy oxide region 17 in the plate thickness direction T to be joined. As shown in FIG. 4, crystal grains constituting the pair of base material portions 16 straddle the alloy oxide region 17 in the plate thickness direction T and the pair of base material portions 16 are joined in the plate thickness direction T.

In FIG. 4, the same-colored portion of the mass indicates one crystal grain, and each crystal grain has a different shade depending on the orientation thereof.

Next, a method for manufacturing the stabilizer 1 with the above-described configuration will be described.

Figure 2:
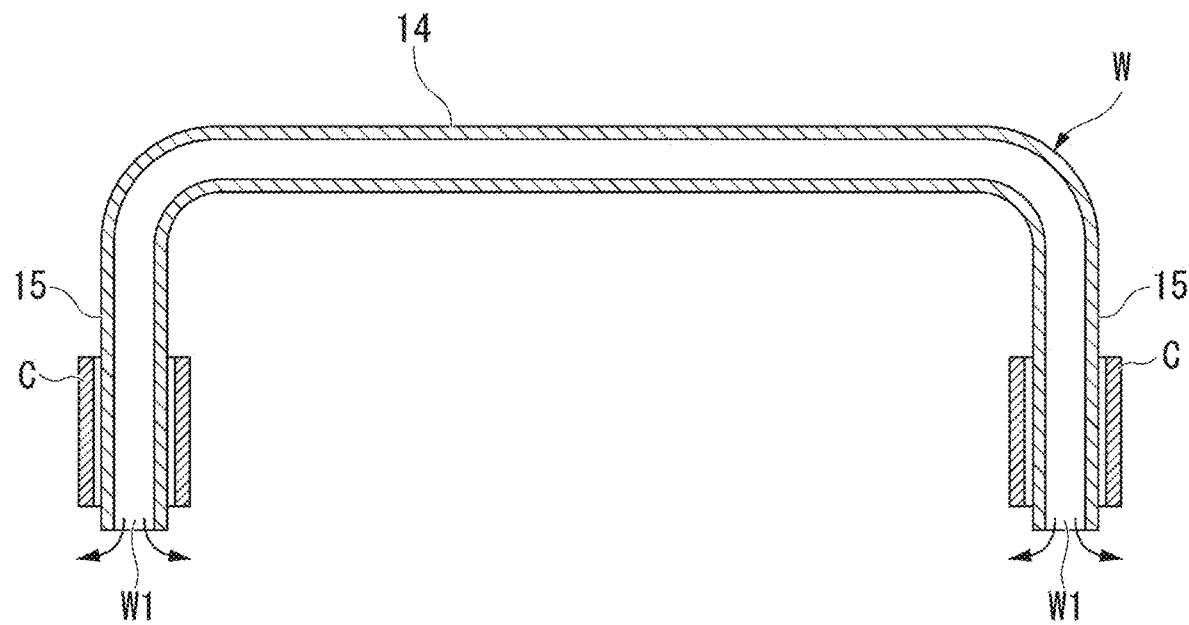
FIG. 2 is an explanatory diagram illustrating a method for manufacturing the stabilizer shown as an embodiment according to the present invention.

First, the entire straight extending steel pipe W is heated to a temperature below an A1 transformation point and is bent to form the torsion portion 14 and the pair of arm portions 15 as shown in FIG. 2. At this time, the pair of arm portions 15 extend from both end portions of the torsion portion 14 toward the same side in the direction intersecting the torsion portion 14. Next, the entire steel pipe W is heated to a temperature equal to or higher than the A1 transformation point and lower than the melting point by resistance heating or the like and quenched.

Next, both end portions of the steel pipe W are simultaneously heated by a heating device C (heating step), and forging processing is applied to both end portions of the heated steel pipe W to form the connection plate portion 12 (forging step). In the forging step, both end portions of the heated steel pipe W are radially crushed to form the connection plate portion 12. The transition portion 13 is formed by deforming the steel pipe W following the formation of the connection plate portion 12 by forging.

Next, a through-hole penetrating the connection plate portion 12 in the plate thickness direction T is formed in the connection plate portion 12 and the connection plate portion 12 is cut to have a desired shape. Then, the connection plate portion 12 is heated to a temperature equal to or higher than the A1 transformation point and lower than the melting point by, for example, resistance heating and is quenched again.

Additionally, the through-hole may not be formed in the connection plate portion 12, the connection plate portion 12 may not be cut, and the connection plate portion 12 may not be subjected to a quenching processing again.

Here, the steel pipe W is made of carbon steel having a composition containing C: 0.20% to 0.50%, Si: 1.5% or less, Mn: 0.3% to 1.5%, and Cr: 0.5% or less by mass and the balance is Fe and unavoidable impurities. The length of the steel pipe W is set to, for example, 500 mm to 3000 mm (about 2000 mm in the illustrated example) and the inner diameter of the steel pipe W is set to, for example, 5 mm to 40 mm (about 40 mm in the illustrated example). In the heating step, both end portions of the steel pipe W are heated to a temperature equal to or higher than 700° C. The heating time is preferably long, but can be appropriately set within the limits of equipment and processes.

Additionally, the material and the size of the steel pipe W and the manufacturing conditions during the heating step may be changed as appropriate.

Then, in this embodiment, in the heating step, both end portions of the steel pipe W are simultaneously heated at the same heating temperature while the steel pipe W is positioned such that a portion of the steel pipe W located on a center side in a longitudinal direction in relation to both end portions of the steel pipe and including at least a center portion of the steel pipe W in the longitudinal direction is substantially horizontal.

In the illustrated example, both end portions of the steel pipe W are heated while both end openings W1 of the steel pipe W are directed downward. At this time, both end portions of the steel pipe W are located below the torsion portion 14 and are located at the lowest portion in the steel pipe W. The positions of both end portions of the steel pipe W in the up and down direction are the same as each other. Further, at this time, both end portions of the steel pipe W are heated while the torsion portion 14 of the steel pipe W is positioned substantially horizontally.

Additionally, in the heating step, both end openings W1 of the steel pipe W may be located above the torsion portion 14, both end portions of the steel pipe W may be located at different positions in the up and down direction, and both end openings W1 of the steel pipe W may be directed upward. Further, in the heating step, both end portions of the steel pipe W may be heated at different heating temperatures. Further, the steel pipe W may be bent after the heating step.

The heating step includes an oxygen reduction step and a reduction step.

In the oxygen reduction step, since both end portions of the steel pipe W are simultaneously heated, air inside both end portions of the steel pipe W simultaneously expands and Fe oxides are formed on the inner peripheral surfaces of both end portions of the steel pipe W while the entry of external air into both end portions of the steel pipe W is regulated. In this embodiment, since both end portions of the steel pipe W are heated while both end openings W1 of the steel pipe W are directed downward or horizontally in the oxygen reduction step, air inside both end portions of the steel pipe W expands while smoothly entering the steel pipe W and as indicated by arrows in FIG. 2, air inside the steel pipe W is always discharged from both end openings W1 of the steel pipe W. Accordingly, Fe oxides are formed on the inner peripheral surfaces of both end portions of the steel pipe W while the entry of external air into the steel pipe W is reliably regulated and the amount of oxygen contained in the air inside both end portions of the steel pipe W is reduced.

In the reduction step, similarly to the oxygen reduction step, both end portions of the steel pipe W are continuously heated while both end openings W1 of the steel pipe W are directed downward or horizontally. Accordingly, oxygen is removed from Fe oxides by causing a reduction reaction in the Fe oxides formed in the oxygen reduction step while using an easily oxidizable element contained in an Fe alloy forming the steel pipe W as a reducing agent.

As described above, according to the stabilizer 1 of this embodiment, since crystal grains constituting the pair of base material portions 16 straddle the alloy oxide region 17 in the plate thickness direction T as shown in FIG. 4, it is possible to firmly join the pair of base material portions 16 and to prevent a gap from being formed between the pair of base material portions 16. Accordingly, since it is possible to prevent a gap from being formed between the pair of base material portions 16, for example, even when the connection plate portion 12 is quenched after the forging step, it is possible to ensure the strength of the connection plate portion 12 even when the stabilizer 1 is made thinner to reduce the weight.

Since the connection plate portion 12 is made of an Fe alloy containing an easily oxidizable element that is more easily oxidized than Fe, it is possible to reliably obtain the connection plate portion 12 in which crystal grains constituting the pair of base material portions 16 straddle the alloy oxide region 17 in the plate thickness direction T and the pair of base material portions 16 are joined. Further, the Fe alloy contains at least one of Si, Mn, and Cr. Since Si, Mn, and Cr are elements generally contained in spring steel, the current manufacturing method does not need to be significantly changed, and it is possible to reduce an increase in cost and to reliably obtain the connection plate portion 12 in which the pair of base material portions 16 are joined.

According to the method for manufacturing the stabilizer 1 of this embodiment, since both end portions of the steel pipe W are simultaneously heated in the heating step, in the oxygen reduction step, air inside both end portions of the steel pipe W simultaneously expands and Fe oxides are formed on the inner peripheral surfaces of both end portions of the steel pipe W while the entry of external air into both end portions of the steel pipe W is regulated.

Accordingly, since it is possible to reduce the amount of oxygen contained in air inside both end portions of the steel pipe W in the oxygen reduction step, it is possible to reduce the amount of Fe oxides formed on the inner peripheral surfaces of both end portions of the steel pipe W.

Here, the simultaneous heating of both end portions of the steel pipe W in the heating step is not limited to the case of simultaneously starting and ending the heating of both end portions of the steel pipe W if Fe oxides can be formed on the inner peripheral surfaces of both end portions of the steel pipe W while the entry of external air into both end portions of the steel pipe W is regulated and also includes the case of simultaneously heating both end portions of the steel pipe W for a certain time even when the heating start and end timings for both end portions of the steel pipe W in the heating step are different.

The heating step includes the reduction step of causing a reduction reaction in Fe oxides formed in the oxygen reduction step by using an easily oxidizable element contained in the Fe alloy forming the steel pipe W as a reducing agent. Thus, oxygen in the Fe oxides can be removed from the Fe oxides by combining with the easily oxidizable elements in the Fe alloy. At this time, since the alloy oxides B in which oxygen removed from the Fe oxides and the easily oxidizable elements are combined have a low amount of Fe oxides formed in the oxygen reduction step, the alloy oxides do not extend continuously in a layered shape in the circumferential direction around the pipe axis of the steel pipe W, but are scattered in the circumferential direction.

Accordingly, if both end portions of the steel pipe W are radially crushed in the forging step, it is possible to obtain the connection plate portion 12 including the alloy oxide region 17 in which the alloy oxides B are scattered and the pair of base material portions 16 which sandwich the alloy oxide region 17 from both sides in the plate thickness direction T as shown in FIG. 3. At this time, crystal grains constituting the pair of base material portions 16 straddle the alloy oxide region 17 in the plate thickness direction T as shown in FIG. 4 and the pair of base material portions 16 are joined in the plate thickness direction T.

As described above, it is possible to firmly join the pair of base material portions 16 and to prevent a gap from being formed between the pair of base material portions 16.

Since both end portions of the steel pipe W are heated while the steel pipe W is positioned such that a portion of the steel pipe W located on a center side in a longitudinal direction in relation to both end portions of the steel pipe and including at least a center portion of the steel pipe W in the longitudinal direction is substantially horizontal in the heating step, air inside both end portions of the steel pipe W easily expands while smoothly entering the steel pipe W in the oxygen reduction step and the entry of external air into both end portions of the steel pipe W can be reliably regulated.

Since both end portions of the steel pipe W are located at the lowest position in the steel pipe W in the heating step, it is possible to smoothly expand air inside both end portions of the steel pipe W in the oxygen reduction step and to reliably prevent the entry of external air into both end portions of the steel pipe W.

The technical scope of the present invention is not limited to the above-described embodiment, and various modifications can be made within the scope of the present invention.

The connection plate portion 12 may protrude in the left and right direction from the side of the arm portion 15 of the main body cylinder portion 11 and the configuration of the stabilizer may be modified as appropriate.

In addition, the components in the above-described embodiment can be replaced with well-known components as appropriate within the scope of the present invention, and the above-described modifications may be appropriately combined.

INDUSTRIAL APPLICABILITY

By applying a stabilizer of the present invention to the art, it is possible to prevent a gap from being formed between a pair of base material portions.

DESCRIPTION OF REFERENCE NUMERAL

1 Stabilizer
11 Main body cylinder portion
12 Connection plate portion
16 Base material portion
17 Alloy oxide region
50 Suspension device
B Alloy oxide
T Plate thickness direction
W Steel pipe
W1 Opening

The invention claimed is:

1. A stabilizer comprising:
    a main body cylinder portion which is elastically deformable; and
    a pair of connection plate portions respectively connected to a pair of left and right suspension devices,
    wherein each connection plate portion of the pair of connection plate portions includes a pair of base material portions located on both sides in the connection plate portion in a plate thickness direction and an alloy oxide region which is disposed between the pair of base material portions and in which alloy oxides are scattered,
    wherein crystal grains constituting the pair of base material portions straddle the alloy oxide region in the plate thickness direction and the pair of base material portions are joined,
    wherein the connection plate portion is made of a Fe alloy containing an easily oxidizable element that is more easily oxidized than Fe, and
    wherein the alloy oxides are made by combining oxygen, which is obtained by reducing Fe oxides present on an inner peripheral surface of the base material portions prior to joining, and the easily oxidizable element.

2. The stabilizer according to claim 1,
    wherein the Fe alloy contains at least one of Si, Mn, and Cr.

3. A method for manufacturing the stabilizer according to claim 1,
    the method comprising:
    a heating step of heating both end portions of a steel pipe; and
    a forging step of radially crushing both end portions of the heated steel pipe to form the pair of connection plate portions,
    wherein in the heating step, both end portions of the steel pipe are simultaneously heated,
    wherein the steel pipe is made of an Fe alloy containing an easily oxidizable element that is more easily oxidized than Fe, and
    wherein the heating step includes an oxygen reduction step of forming Fe oxides on inner peripheral surfaces of both end portions of the steel pipe and reducing the amount of oxygen contained in air inside both end portions of the steel pipe and a reduction step of causing a reduction reaction in the Fe oxides by using the easily oxidizable element as a reducing agent and removing oxygen from the Fe oxides.

4. The method for manufacturing a stabilizer according to claim 3,
    wherein in the heating step, both end portions of the steel pipe are heated while the steel pipe is positioned such that a portion of the steel pipe located on a center side in a longitudinal direction in relation to both end portions of the steel pipe and including at least a center portion of the steel pipe in the longitudinal direction is substantially horizontal.

5. The method for manufacturing a stabilizer according to claim 3,
    wherein both end portions of the steel pipe are located at the lowest position in the steel pipe in the heating step.

6. The method for manufacturing a stabilizer according to claim 4,
   wherein both end portions of the steel pipe are located at the lowest position in the steel pipe in the heating step.

\* \* \* \* \*